April 5, 1955     T. I. LESTON     2,705,669

METHOD AND TOOL FOR SHAPING THERMOPLASTIC MATERIALS

Filed July 2, 1952

INVENTOR.
THEODORE I. LESTON
BY
HIS ATTORNEYS

United States Patent Office 2,705,669
Patented Apr. 5, 1955

2,705,669

METHOD AND TOOL FOR SHAPING THERMOPLASTIC MATERIALS

Theodore I. Leston, New York, N. Y., assignor to Eutectic Welding Alloys Corporation, Flushing, N. Y., a corporation of New York Application July 2, 1952, Serial No. 296,851

12 Claims. (Cl. 18—47)

This invention relates to the molding of plastics, especially the synthetic resin types. More specifically it relates to an improved structure and method for pressure shaping synthetic resins, particularly polyvinyl resins, by injection, extrusion or compression molding operations.

It is a well known commercial expedient to fabricate various structures from polymerized vinyl compounds such as vinyl acetate resins, vinyl chloride resins, vinyl chloride-acetate resins, vinyl acetal resins, and vinylidene chloride resins with various type pressure shaping tools such as calenders, dies, molds, injection molding machines, etc. However, the inherent characteristics of the thermoplastic resins, particularly their tendencies to stick to the mold surfaces and their diverse resistances to flaming and external chemical agents, creates serious problems in constructing the pressure shaping equipment therefor. The vinyl acetates and acetals are readily flammable while the vinyl chlorides and chloride acetates are often slightly less so. Further, these resins always contain a certain amount of moisture which forms undesirable volatile materials in the resin during molding. As a consequence, when these resins are compressed within or ejected into a mold or extruded through a die, the additional heat generated by the pressure induced friction and the contact of the volatile materials with the hot mold or die wall often results in a charring or burning of the resin and a resultant adherence to the wall structure.

Another difficulty encountered in molding these resins is the fact that the polyvinylidene chlorides and the vinyl chloride-acetate copolymers decompose at ordinary molding temperatures in the presence of iron and steel and attack the die or mold structures with a resultant destruction thereof. Attempts have been made to obviate this difficulty by using a copper-beryllium alloy and by chrome plating all structures which contact the molten resins. But this procedure has failed to prevent charring and is expensive. Moreover, it is difficult to plate minute bores and such require repeated replatings.

Other quite unsuccessful measures have used die mold structures formed of ceramics, i. e., clay, talc, porcelain or heat-resistant glass materials which likewise failed to provide a complete solution due to an increased tendency of the resinous material to stick to the surface of the ceramic.

Still other unsuccessful attempts have been made to prevent this sticking of the resin material within the die or mold by lubricating the mold with various waxes or a powder of zinc stearate. This practice, however, introduces foreign matter into the resin material and still fails to eliminate charring.

It is therefore a prime object of the instant invention to provide a pressure shaping tool or apparatus for thermoplastic resins which completely eliminates both charring of the resin and adherence thereof to the tool surface. It is a further object of the invention to provide a pressure shaping tool structure for resin materials which is completely impervious and chemically inert to the resin. Other and distinct objects will be apparent from the description and claims that follow.

The present invention contemplates the forming of a pressure shaping tool structure wherein the resin contacting surface thereof is amalgamated with a thin film of mercury to provide a protective coating which performs the triple function of lubricating, eliminating charring, and preventing chemically induced deterioration of the tool surface. It has been discovered that the maintenance of a mercury film between the sticky, resinous material and the tool wall surface completely eliminates any sticking or adherence therebetween, as well as eliminating substantially all charring and burning of the molded material. This latter characteristic is a wholly unexpected one in view of the fact that conventional lubricants had often eliminated sticking of the resin to the tool structure but had never prevented a charring thereof. Repeated comparative tests have led to the conclusion that the previously encountered charring of the resins during the molding operation had been due largely to local "hot spots" produced by the itinerant wearing away of conventional lubricants and a consequent adherence between the surface strata of resin and the tool wall surface. The mercury film, on the other hand, forms a firm bond with the wall surface during amalgamation and presents an immobile, self-sustaining, contiguous surface which has a frictionless and non-adhering contact with the heated plastic resin, thus effectively precluding the formation of such "hot spots."

Another distinct characteristic of the protective mercury film is the complete antipathy between it and the resinous material which results in a consequent elimination of any chemically induced deterioration of the die or mold structure. This chemically inert property not only permits the fabrication of die and mold structures from normally corrodable irons and steels, but also results in a finished article which is completely free of adherent foreign matter such as the prior art lubricating oils and powders.

In practice the mercury film may be applied to the wall surfaces of compression molds, or to the internal wall surfaces of the heating chamber and/or ejection nozzle in conventional injection molding machines, or to the die surfaces in conventional extrusion dies (both male and female parts). The present invention further contemplates the use of any conventional or suitable substance such as iron, steel, copper, brass, or alloys thereof, or even ceramics such as porcelain or glass as the basic mold or die fabricating material. Readily amalgamable materials such as lead, copper or beryllium-copper are preferred, but the mercury amalgam film can also be easily obtained on iron, steel, clay, porcelain or glass surfaces by simple preamalgamating procedures.

In cases where it is desirable to use iron as the basic shaping tool material, the mercury film can be obtained by forming the iron matrix to be of a relatively porous nature and thereafter impregnating it under pressure with mercury. In some instances it may be advisable to provide wetting agents or small amounts of readily amalgamable substances such as lead, tin, cadmium, copper or idium to the iron matrix in order to provide a tightly adherent amalgam bond. In this latter instance the additives are preferably restricted to the regions adjacent the resin-contacting surfaces of the tool.

Alternatively, this result can be obtained by electroplating the iron with a thin copper film which is in turn readily amalgamated with mercury. This latter practice is preferred where the basic material is high heat resistant steels or other non-porous and non-amalgamable metals.

In other cases where it is desirable to employ a ceramic as the basic material for the shaping tool, the amalgamated mercury film may be obtained by prebonding the ceramic, porcelain or glass with an amalgamable metal film. One such procedure which has been found to be exceedingly effective for this purpose is the spraying of molten lead (usually with a little silver) onto the surface of the ceramic whereby it reacts to form a lead oxide tightly bonded in the intersticial spaces of the matrix material and an internal adherent surface film of lead. This provides a permanent surface union between the ceramic, porcelain or glass matrix and the lead film, which latter may thereafter be amalgamated with mercury in the usual manner.

The above recited prebonding procedure is merely an illustrative example and other equivalent procedures will be apparent to those skilled in the art.

Reference will now be made to the drawings in describing several specific embodiments of the invention and in which.

Figure 1:
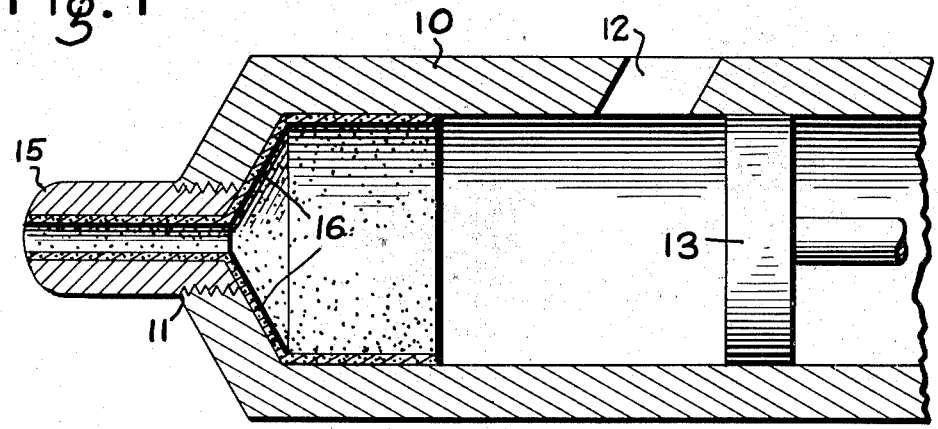
Fig. 1 is a fragmentary sectional view of an injection molding chamber embodying the invention.

The plastic materials shaping tool illustrated in Fig. 1 is a conventional injection molding unit and includes a materials loading chamber 10 in the form of an elongated cylinder, a piston plunger 13 and an injection nozzle 15. A feed port 12 is provided in the forward portion of chamber 10 to admit intermittent charges of a plastic material, such as the synthetic resins previously described, in timed relationship to the withdrawal of the plunger 13 from the bore of the chamber. In practice, the chamber 10 is heated and quickly melts the resin charge into a readily flowable and plastic state whereby it may be easily forced through the injection nozzle 15 upon the next sequential stroke of the plunger 13.

The injection nozzle 15 includes a central perforation or orifice of a predetermined configuration through which the plastic material is forced and external screw threads 11 which cooperate with threads in chamber 10 to provide an interchangeable mounting. This construction is conventional and need not be further described.

As shown, a thin film or coat of mercury 16 is amalgamated on the inner surfaces of the chamber 10 and the orifice of nozzle 15. It will be realized however that the amalgam film may be applied to only the inner surface of the nozzle orifice if so desired. In either event the film forms a continuous protective coating which completely separates and isolates the plastic material being shaped from direct contact with the walls of the injection nozzle or heating chamber, while simultaneously providing an immobile bearing surface of an extraordinarily non-adherent character, to completely obviate any charring of the plastic material.

The chamber 10 and nozzle 15 may be constructed from any suitable material and the mercury film amalgamated therewith by any of the procedures previously defined.

It will be further appreciated that the relatively small mercury loss incurred after extended operation may be simply and easily replenished by feeding an additional amount of liquid mercury with a single or a plurality of the plastic material charges fed through the feed port 12. The lack of affinity between the two substances readily facilitates the separation of the two and the subsequent amalgamation of the additional mercury with the film coat 16. Alternatively, the replenishing supply of mercury may be applied to the bearing surfaces of the piston 13, relying upon the frictional forces produced during reciprocation of the piston to reamalgamate the film 16. In the latter case, the lateral pressure exerted by the plastic material as it is forced from the chamber 10 through nozzle 15 is sufficient to cause any excess film coating on the walls of chamber 10 to be redistributed into and throughout the nozzle orifice. This movement of the mercury film occurs only when there is an undistributed excess.

Figure 2:
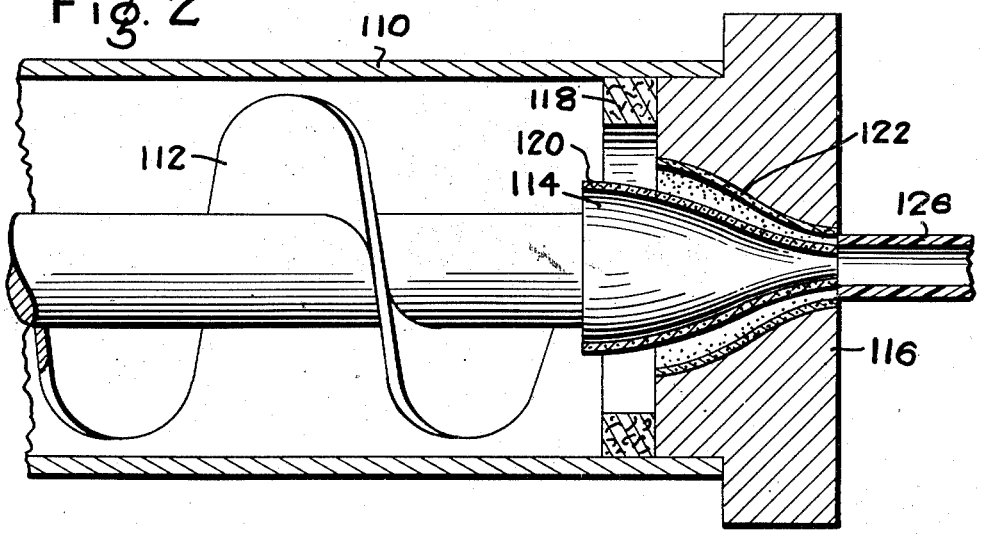
Fig. 2 is a fragmentary sectional view of an extrusion chamber embodying the invention.

Fig. 2 illustrates the application of the invention to a conventional extrusion die unit which consists of a heated chamber 110, a feed screw 112, a male die 114 on the lead end of the screw, and a mating female die member 116 enclosing one end of the chamber 110. A suitable bearing seal 118 is provided near the die member 116 to prevent ingress of dirt, grime, etc.

In order to protect the die members from erosion due to undesirable chemical activity and to prevent adherence of the plastic material thereto, or a charring of the latter, a thin film of mercury 120 and 122, respectively, is amalgamated on the mating surfaces of the respective die members. These protective films may be varied in thickness at will by well known methods but are preferably maintained between $1/10,000$ and $1/100$ of an inch. Although thicker films are easily obtainable such are not generally necessary due to the particular antipathy between the synthetic resins and the mercury.

In operation any of the aforementioned synthetic resins are charged into the heated chamber 110 where it becomes melted and easily flowable and due to the continuous rotation of the screw conveyor 112 is progressively fed towards the opposed die members 114 and 116. At the working end of the chamber 110, the molten resin is forced between the converging and shaping surfaces of the die members 114 and 116 and because of the protective mercury film overlying such surfaces is easily and speedily extruded from the mechanism into the desired article shape, such as the cylindrical sheath 126 illustrated, without clogging or jamming the die orifice and without any charring of the extruded material.

As shown, the male die member 114 is rotatably mounted on the end of the screw conveyor 112 but it will be readily appreciated, that when desired, it may be stationarily positioned as by means of a fixed mounting rod extending through the center of the conveyor.

It is obvious that any of the previously noted materials may be used to form the die members.

Figure 3:
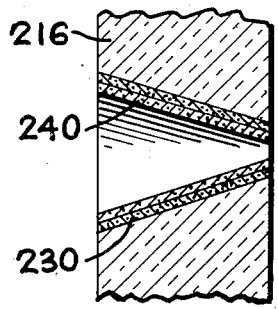
Fig. 3 is a fragmentary sectional view of another form of the invention.

Fig. 3 illustrates a further application of the invention to a plastic material pressure shaping tool in which it is desired to use a ceramic as the tool matrix. As shown, a die member 216, similar to 116 in Fig. 2, is formed of a ceramic material such as clay, porcelain or Pyrex glass. In order to adapt such member to hold a mercury amalgam, however, it is first necessary to prebond the die surface thereof with an amalgamable film 230.

In the instant example the film 230 is formed by spraying molten lead, mixed with a slight amount of silver, onto the die face of the matrix where it reacts to form a lead oxide tightly bonded in the interstitial spaces of the matrix and an integral surface film of amalgamable lead.

Thereafter the lead surface 230 is amalgamated with a film of mercury 240 which forms a tightly adherent and immobile protective surface thereover. By this simple two step procedure it is possible to form any of the conventional and well known plastic material pressure shaping tools from a base matrix of ceramic while completely eliminating the sticking and charring problems encountered heretofore.

One of the many unexpected advantages of the instant invention is the fact that the relatively high temperatures at which the injection molding or extrusion mechanism operates assists in maintaining the mercury amalgam on the configurating surfaces. This is attributable to the fact that higher temperatures increase the amalgamation factor of the various base materials whereby the amalgam film is continuously maintained in a condition conducive to additional amalgamation so that any itinerant movement of mercury is normally prevented and any loose mercury, such as may be carried along with the plastic materials, is readily caught and entrapped by the surface film.

It will thus be apparent that the instant invention provides the tool maker with a wide selection of basic matrix materials while obtaining molding or extruding characteristics and advantages which were not heretofore attainable in any known pressure shaping tool structure for molding thermoplastic resins and synthetic resins.

Among the many outstanding features of the instant invention is the fact that a single surfacing film of a simple and easily handled metal performs the triple function of lubricating to prevent sticking or clogging of the plastic material to the tool surfaces, eliminates substantially all charring and burning of the plastic material, and completely obviates the possibility of chemically induced deterioration of the tool surfaces. These desirable results are attained while reducing the initial and upkeep costs of such tools by eliminating the prior art chrome plating techniques.

Another feature of the invention is the fact that a single application of a thin mercury film has a relatively long life, demonstrated in repeated tests to be normally more than ten times the working life of other conventional die and mold lubricants. In this respect the wearing ability of the film approaches that of chrome plated dies and molds where small pits or blemishes rapidly reduce the protective effect of the platings due to the chemical activity which is accelerated by local "hot spots" at such points, whereas the mercury film of the instant invention, being substantially immobile and self-sustaining, does not wear away in isolated points or spots. Further, the slight amount of mercury which is lost during the molding or die working may be easily reclaimed in toto, either from the surface of the formed plastic material or the edges of the die or mold, by conventional reclamation procedures. The slight amount of mercury so lost can be expediently replenished by feeding additional mercury onto the amalgamated surface by gravity or manually by friction.

Still another feature of the invention is the provision of a pressure shaping tool which is suitable for molding various types of synthetic vinyl resins interchangeably without any danger of contaminating, charring or scarring either the shaped article or the tool.

Although the invention has been disclosed as being of particular efficacy in dies and molds for working vinyl resins, it will be readily appreciated that it is of equivalent utility in the working of other synthetic resins, regenerated cellulose and cellulose derivatives such as cellulose acetate, ethyl cellulose, and carboxy methyl cellulose, natural cellulose fiber derivatives such as wood pulp and fiber board of the "Masonite" type, and other easily ignitable substances where conventional lubricating or protective materials cannot be used because of contamination or other undesirable chemical activity, or because of fire hazards.

The invention may be applied to the molding, forming or extrusion of rods, pipes, sheets, bars, etc., or even to articles of intricate design and configuration without any substantial loss of efficiency.

As many apparently widely different embodiments of this invention may be made without departing from the spirit and scope hereof, it is to be understood that the invention is not limited to the specific embodiments hereof, except as defined in the appended claims.

What is claimed is:

1. A method of pressure shaping a precisely configurated article from a thermoplastic material including the step of maintaining a film of immobile, discrete particles of mercury between the material and the shaping tool during the pressure shaping thereof.

2. A method of forming precisely shaped articles from a thermoplastic material by ejecting such material in a molten state through a restricted orifice while simultaneously maintaining a film of immobile, discrete particles of mercury between said material and the surface of said orifice.

3. As an article of manufacture, a pressure molding apparatus for thermoplastic materials including a material loading chamber and an ejection nozzle having an outlet orifice in which the internal wall surfaces of said orifice are amalgamated with a film of mercury having immobile discrete particles forming a bearing surface.

4. The combination set forth in claim 3 in which the internal wall surfaces of said chamber are also amalgamated with a film of mercury.

5. The combination set forth in claim 3 in which said ejection nozzle includes concentric opposed shaping surfaces which are also amalgamated with a film of mercury having immobile discrete particles forming a bearing surface.

6. As an article of manufacture, a pressure shaping tool having confining surfaces of a precise configuration for shaping a thermoplastic material to a desired configuration, in which said surfaces are amalgamated with a film of mercury having immobile discrete particles forming a bearing surface.

7. The combination set forth in claim 6 in which said tool is formed of a ceramic material and includes an adherently bonded metallic surface to which said mercury is amalgamated.

8. The combination set forth in claim 7 in which said adherently bonded metallic surface includes lead and lead oxide.

9. The combination set forth in claim 6 in which said tool is formed of a relatively porous iron matrix in which said mercury is entrapped.

10. The combination set forth in claim 9 in which said matrix includes a mercury amalgamable material interspersed therein.

11. The combination set forth in claim 9 in which a wetting agent is included in the mercury to provide a firmly bonded amalgam with the iron matrix.

12. The combination set forth in claim 6 in which said shaping tool includes a surface plating of copper to which said mercury is amalgamated.

References Cited in the file of this patent

UNITED STATES PATENTS

| | | |
|---|---|---|
| 1,544,828 | Fuchs | July 7, 1925 |
| 2,144,548 | Safford | Jan. 17, 1939 |
| 2,219,700 | Perrin et al. | Oct. 29, 1940 |

OTHER REFERENCES

Goggin et al., "Vinylidene Chloride Polymers," Ind. & Eng. Chem., March 1942, pages 327–32.